May 17, 1949.  F. P. HOCHGESANG ET AL  2,470,743
METHOD AND APPARATUS FOR GEOPHYSICAL PROSPECTING
Filed Sept. 16, 1944  3 Sheets-Sheet 1
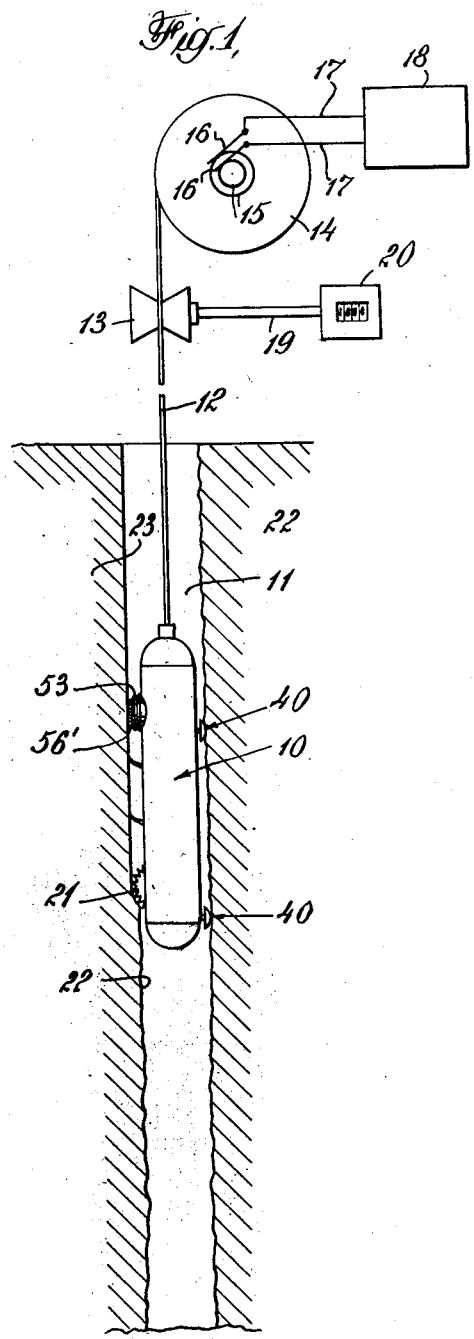
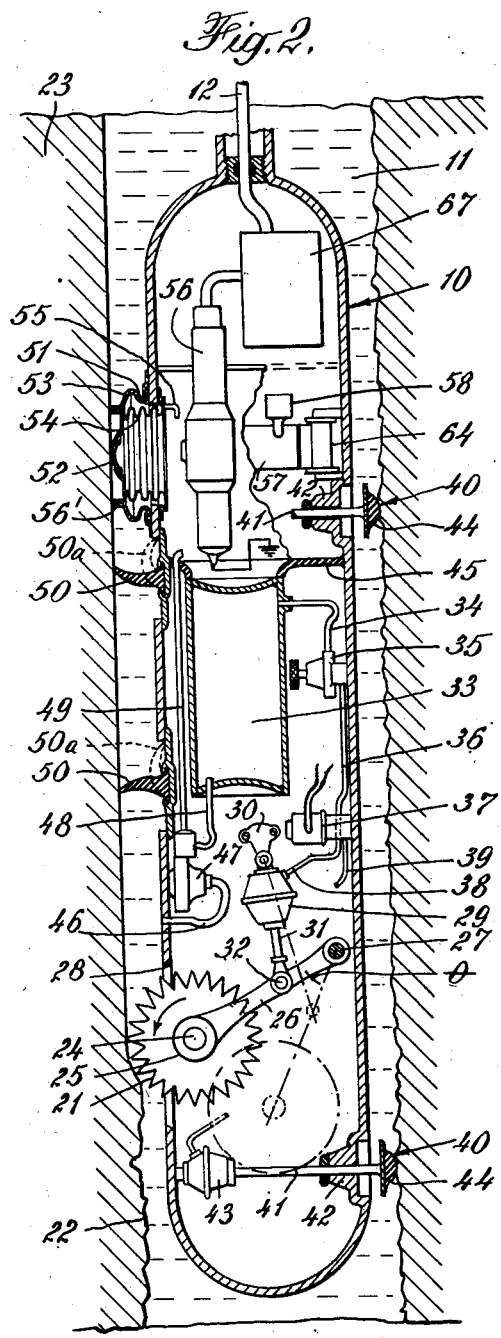
INVENTORS
Frank P. Hochgesang
and Carleton H. Schlesman
BY James Y. Cleveland
ATTORNEY May 17, 1949.  F. P. HOCHGESANG ET AL  2,470,743
METHOD AND APPARATUS FOR GEOPHYSICAL PROSPECTING
Filed Sept. 16, 1944  3 Sheets-Sheet 2
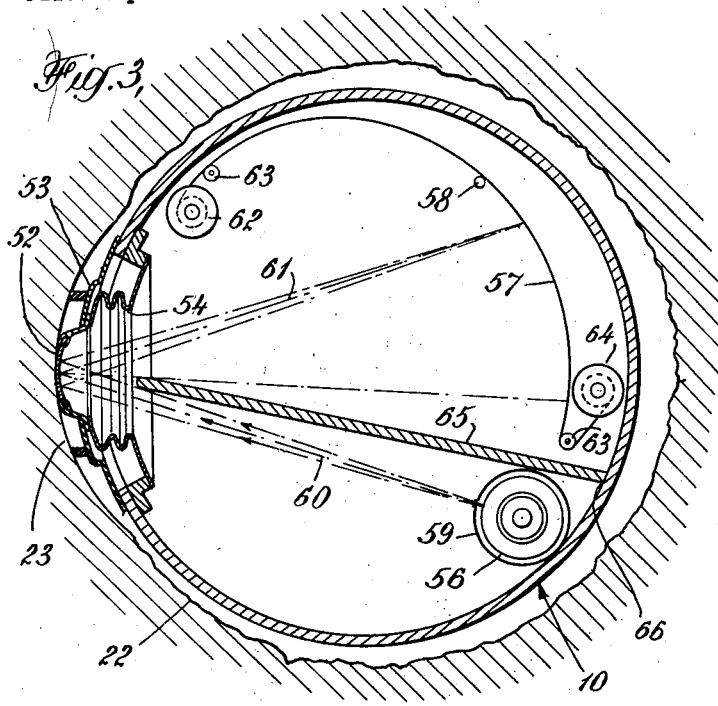
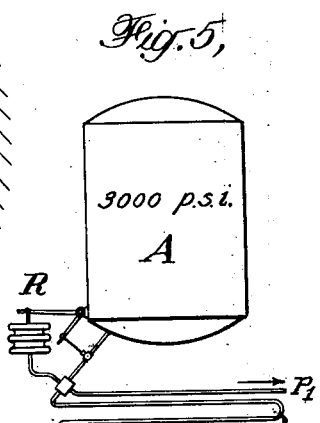
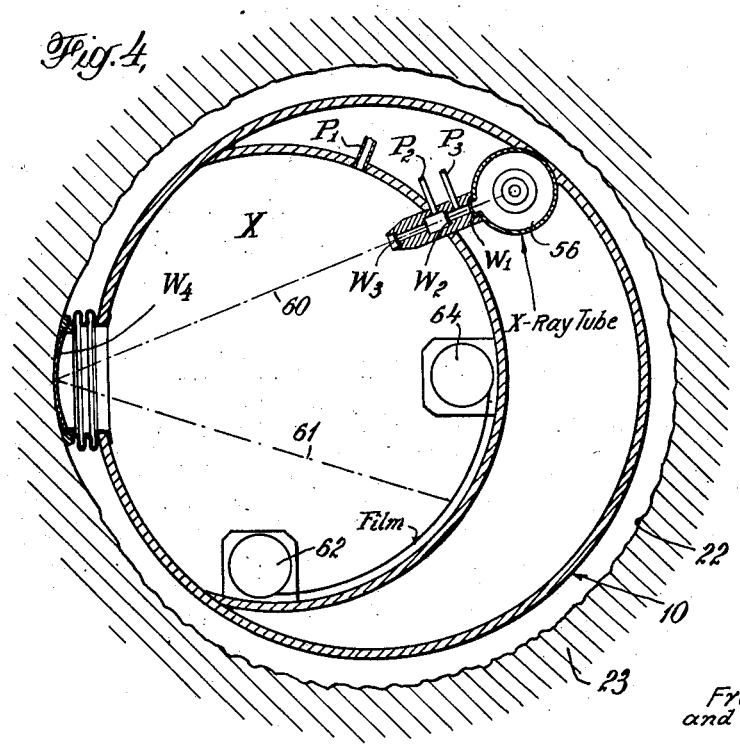
INVENTORS
Frank P. Hochgesang
and Carleton H. Schlesman
BY
James Y. Cleveland
ATTORNEY May 17, 1949.  F. P. HOCHGESANG ET AL  2,470,743
METHOD AND APPARATUS FOR GEOPHYSICAL PROSPECTING
Filed Sept. 16, 1944  3 Sheets-Sheet 3
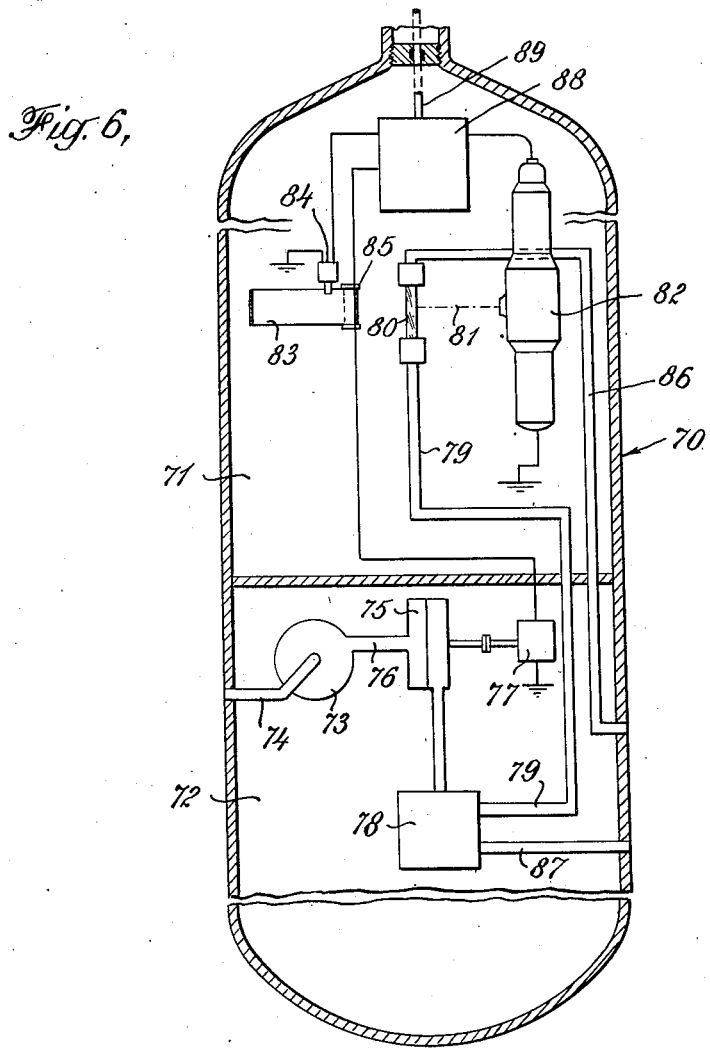
Fig. 6,
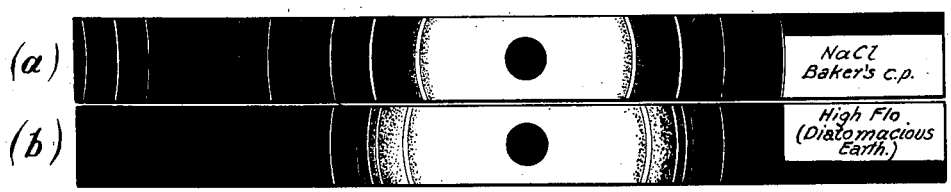
Fig. 7.
X-Ray Diffraction Patterns
showing method of comparing Films
of two different materials
INVENTORS
Frank P. Hochgesang
and Carleton H. Schlesman
BY
James Y. Cleveland
ATTORNEY Patented May 17, 1949

2,470,743

UNITED STATES PATENT OFFICE 2,470,743

METHOD AND APPARATUS FOR GEOPHYSICAL PROSPECTING

Frank P. Hochgesang, Woodbury, and Carleton H. Schlesman, Camden, N. J., assignors to Socony-Vacuum Oil Company, Incorporated, a corporation of New York Application September 16, 1944, Serial No. 554,380

1 Claim. (Cl. 250—53)

This invention relates generally to the art of geophysical prospecting and more particularly to the art of surveying subsurface strata in situ by X-ray diffraction analysis.

The present invention deals with a method and apparatus of wide applicability which serves to make core drilling or other sampling unnecessary and which provides the further advantage of making an accurate analysis of formations in situ during the running of a survey. The present method and apparatus while intended primarily for use in oil well surveying where the hole may be filled with drilling fluid is equally applicable, and the apparatus may be simplified in form for use in mineral prospecting by the drilling of bore holes and the examination of the rock structure underlying bridge piers and dam or building foundations.

In practicing this invention the necessary apparatus for making photographs of X-ray diffraction patterns of the substrata, controllable electrically from the surface by suitable electrical connection, is placed in a capsule or bomb which can be lowered into a drill hole. Means are also carried by the capsule or bomb, actuable by apparatus within the capsule or bomb that is controlled from the surface, for scraping and cleaning the wall, where scraping and cleaning are necessary, in order that the X-ray diffraction pattern will be of the penetrated stratum and not of the mud sheath that lines the drill hole.

Admittedly it is well known that X-ray diffraction analyses can be made of cores once they are made accessible by removing them from the drill hole but so far as applicants are aware no one has advanced a method and apparatus for making such analyses of geological substrata in situ.

Additionally it is known in the art that well surveys have been made by lowering a source of ultraviolet radiation into the drill hole and measuring or recording the reflected or diffused radiation as an index of the substrata. The use of a range of wave lengths of ultraviolet radiation as a source, recording the reflected or diffused radiation and making a spectral analysis of the record is also taught by the prior art.

Many patents teach the use of various types of radiation, including X-rays, in making well surveys, but nowhere is there a suggestion that a well survey can be made that positively identifies the substrata by X-ray diffraction analysis of the substrata in situ.

The present invention has many other applications and advantages. For example, in a cased well the apparatus may be used without alteration to determine the depth at which casing has been set or, with slight modification, it is equally applicable to make analyses of the fluid in the well at various horizons. If water is seeping into the well a survey with this instrument will reveal the nature of the crystalline salts present and by showing progressively the change of composition from water to drilling fluid will permit accurate location of the point of entry of the water.

Therefore the primary object of this invention resides in the provision of a method and apparatus for surveying a drill hole by X-ray diffraction analyses of substances in situ within a bore hole.

Another object of this invention resides in the provision of a method of analyzing underground structures or solids suspended in fluids contained in underground pools or wells which consists in subjecting the material to be examined to a beam of X-rays and recording the distinctive diffraction pattern produced by the material being examined by photographic means.

A further object of this invention resides in the provision of a self-contained apparatus for securing X-ray diffraction analyses of the type described, capable of being easily transported, readily available for examination of surface or subsurface materials, rock strata of fluids, embodying a compact X-ray tube and diffraction camera equipped to effect changing of the film by remote control and marking the film to indicate depth or number of sample.

Still another object of this invention resides in the provision of a pressure-resisting container for the X-ray tube, the camera and other equipment containing windows transparent to X-rays supported by suitable curvature of the windows by suitable increments of internal pressure maintained by gas pressure from a gas supply tank.

This invention further contemplates means for extending or retracting the exterior ray window into or out of contact with the formation.

Another object of this invention resides in the provision of means for placing a sample of the solids suspended in fluid to be examined in the X-ray beam so that rays diffracted thereby can be photographed.

Still another object of this invention is the provision of a system of spring-operated or power-operated guides for locating the measuring equipment in suitable position in a well or other underground recess.

A further object of this invention resides in the provision of apparatus for cleaning the face of the formation being analyzed such as a power-operated milling device, a mechanical scraper, or a high-pressure water cutting jet operating against the face of the formation.

This invention also contemplates a compact arrangement of the camera and all auxiliary equipment and its power operating equipment in a properly coordinated form controlled from the surface by means of carrier currents so that all functions, including power supply, may be secured through a cable of two wires or a drill pipe or ground connection and a single insulated wire.

It is also an object of this invention to provide a method and apparatus for measuring the porosity of formations at great depths below the earth's surface, either by milling to various depths from the face of the well or by means of side wall boring and subsequent analyses of the chips.

This invention also contemplates means for determining the lower limit of the casing in a well as well as the location of cement where it protrudes into the well.

Other objects and advantages of this invention will become apparent from the following detailed description thereof when considered with the drawings in which Figure 1 is a diagrammatic illustration of a well surveying operation as contemplated by the present invention;

Figure 2 is an enlarged vertical sectional view of a portion of a drill hole and the surveying apparatus disposed therein;

Figure 3 is a cross sectional view taken along the line 3—3 of Figure 2;

Figure 4 is a horizontal sectional view of the capsule and recording chamber showing one method of protecting the window of the X-ray tube from high pressures;

Figure 5 is a diagrammatic illustration of a pressure supply system for controlling the differential pressures on the windows shown in Figure 4;

Figure 6 is a fragmentary vertical sectional view of a modification of the invention as disclosed in Figure 2; and Figures 7a and 7b are X-ray diffraction patterns illustrating the method of comparing photographs of two different diffraction patterns.

Referring to the drawings in detail, particularly Figure 1, there is shown a capsule, cartridge, or bomb 10 that is adapted to be lowered or raised in a drill hole 11 by a cable 12. Capsule 10 is formed of steel or other pressure resisting metal capable of resisting the high pressures encountered in a deep drill hole. Cable 12, in addition to supporting the capsule 10 and acting as means for raising and lowering it in the drill hole, also carries the electrical conductor or conductors for controlling the apparatus housed in the capsule.

Cable 12 extends from the capsule 10 out the mouth of drill hole 11 and over a measuring wheel 13 to a cable supply drum 14. Electrical connection is made to the conductors carried by the cable on the drum through slip rings 15 and brushes 16. Conductors 17 lead from the brushes to a power supply and control unit 18.

Drum 14 may be driven by any conventional source of power, not shown, to raise or lower capsule 10 in the drill hole 11.

Measuring wheel 13 may be connected by a shaft 19 to a depth indicator or recording device 20 of conventional design.

In the majority of cases where surveys are made in deep uncased drill holes the walls are lined with a mud sheath. In order to make a photograph of an X-ray diffraction pattern of the strata this mud sheath must be removed, at least from a portion of the wall. To this end milling cutters 21, which project through the housing of capsule 10, are provided to remove the mud sheath 22 from the face of the strata 23.

Referring to Figure 2 it will be seen that cutters 21 are mounted on a shaft 24 that is adapted to rotate in a bearing 25 carried by one end of link 26. Cutter shaft 24 may be driven by an electric or air motor, not shown. Link 26 is pivotally mounted at its opposite end on a shaft 27 that is secured to the inside wall of the housing of capsule 10. Link 26 is adapted to move through an angle θ to move the cutters 21 in the opening 28 in the housing, to bring them into and out of contact with the wall of the drill hole. Rotation of link 26 is effected by means of an air cylinder 29 which is appropriately pivotally supported in the housing by anchor means 30. Piston rod 31 extending from air cylinder 29 is pivotally connected to link 26 at the intermediate point 32.

Compressed air is supplied to air cylinder 29 from a reservoir 33 through conduit 34, pressure reducing valve 35, conduit 36, electrically controlled valve 37 and conduit 38. Air from cylinder 29 is discharged through vent 39. The electrical control for valve 37 and the motor which drives the milling cutters 21 will be hereafter described.

Capsule 10 is provided with wall guides 40 that, when extended, are adapted to bear on the wall of the drill hole at points opposite the milling cutters 21 so that pressure can be applied to the cutters 21. Air cylinder 29 in addition to serving as means to retract and extend the cutters 21 also serves to control the feed pressure placed on them.

Wall guides 40 each comprise a rod 41 mounted in a bearing 42 for reciprocation radially with respect to the cylindrical housing of the capsule 10. The inner ends of the rods 41 are appropriately provided with motive means, such as air cylinders 43, for moving the guides into and out of contact with the wall of the drill hole.

Air is supplied to the cylinders 43 from the pressure reducing valve 35 through electrically controlled valves, not shown, that are similar to valve 37.

The outer end of the rods 41 are provided with shoes 44 that are adapted to engage the wall.

That portion of the interior of capsule 10 which houses the cutter operating equipment, air reservoir 33, pressure reducing valve 35, and the bottom wall guide 40 is separated from the upper portion, the photographic chamber within the capsule, by a diaphragm 45. The diaphragm 45 therefore divides the interior of the capsule into two chambers, a bottom chamber that may be open to the fluid in the drill hole and an upper chamber which contains the photographic equipment and a portion of the electrical control equipment and which is sealed so that the fluid in the drill hole cannot enter it.

In order that the pressure of the fluid in the drill hole will not rupture the diaphragm 45, means are provided for equalizing the pressure in the two chambers. Conduit 46, having one end communicating with the fluid in the drill hole, leads to a pressure regulator valve 47 which on increase in pressure of the drill hole fluid will admit air from the reservoir 33 through conduits 48 and 49 to the upper chamber to equalize the pressure. When the outside pressure is reduced valve 47 opens a vent to the upper chamber to reestablish a pressure balance.

As a further aid to cleaning the face of the stratum after the mud has been milled therefrom by cutters 21, scrapers or squeegees 50 are provided which follow the milling cutters 21 as the capsule 10 is lowered in the hole. Scrapers 50 may be formed of rubber and be of the retractable or self-retracting type. These scrapers are secured to the housing of capsule 10 above, but in vertical alignment with the cutters 21. When not in use the scrapers may be retracted to the position shown in dotted lines at 50a.

As shown in Figures 2 and 3 the upper chamber of capsule 10, which houses the X-ray photographic equipment for making photographs of X-ray diffraction patterns, is provided with an opening 51 in which is sealed a window 52. Window 52 is so positioned that it is in vertical alignment with the cutters 21 and the scrapers 50. The sealing means for window 52 comprises a pair of concentrically disposed bellows 53 and 54 which may also serve as means for extending the windows into contact with the wall and retracting it. This can be accomplished by forcing fluid into the sealed off space between the two bellows. Fluid may be conducted to the chamber defined by the two bellows through a conduit 55 that extends from the chamber through an electrically controlled valve, similar to valve 37, to the reservoir 33. The window housing is provided with mud rings 56' which serve as means to steady the window in position, cushion it, hold back the drilling mud, and form a chamber between the window and the face of the stratum which can be blown clean by air or washed clean with fresh water.

The X-ray equipment chamber is sealed by the diaphragm 45 in the manner described above so that it operates in air or gas under pressure or if necessary in a vacuum. In order to protect the X-ray tube and the necessary thin windows from pressure which may exist in the fluid in the well, a series of thin windows transparent to X-rays are employed and are supported by internal gas pressure so that the pressure on the outermost window equals or slightly exceeds that in the hole. By slightly increasing or decreasing this internal pressure the X-ray window may be placed in contact with the formation or withdrawn by bellows action. In the simplest form the X-ray tube may be made of metal with rugged glass seals and the beam projected through a thin Lindeman window which is very small and is curved to obtain strength. If necessary, a number of windows may be used and a pressure differential established between successive windows. This is illustrated in Figures 4 and 5.

When employing a number of windows each must be formed of a material which will transmit X-rays such as beryllium foil about $10/1000$ inch thick or Lindeman (lithium glass) about $30/1000$ inch thick.

Assuming the fluid in the well to be under 2000 pounds pressure, the window difficulty can be surmounted by handling this pressure in several stages. The X-ray tube is evacuated; thus window W separates the high vacuum from air at 50 pounds pressure. Window $W_2$ permits the pressure in the next small chamber to be built up to 400 pounds, and the pressure between windows $W_2$ and $W_3$ can then be built up to 900 pounds. The camera area, that is the pressure between windows $W_3$ and $W_4$, might be under 2200 pounds pressure. The higher pressure in this vessel permits the Sylphon bellows to expand against well pressure.

In operation a source of high pressure gas is carried in the tank A. Regulating valve R is responsible for the control of pressure in chamber X which is connected to the system through tube $P_1$. The network between cylinders A and B operates similarly to an electrical bleeder resistance, that is, a pressure differential is automatically set up as a result of flow of the gas through the capillary tubes so that the desired pressures are obtained at $P_2$ and $P_3$ which are always proportional to the external pressure.

In such a system when it is desired to retract the window $W_4$ from the wall of the drill hole, regulator R shuts off the flow of air until the pressure within the chamber X is reduced to the desired value, perhaps 1800 pounds in the example. Regulator R is remotely controlled from the surface. A small motor may serve to increase or decrease the tension on the regulator. This type of device is commonly employed in remotely operated engine governors.

Again referring to Figures 2 and 3, the recording equipment, located in the upper chamber, may consist of an X-ray tube 56, the window 52, the photographic film 57, and the depth marker 58. As shown in Figure 3 the X-ray tube 56 is positioned in one side of the chamber and is adapted to give out a high intensity beam of monochromatic X-rays, such as those secured, for example, from a molybdenum or other suitable target. This beam is directed through a slit formed in the shield 59 along the path 60 in the form of a narrow pencil of rays. The rays after passing through window 52 are dispersed by the stratum, which acts as a diffraction grating, and is back-reflected through the window 52 along the paths 61 to the photographic film 57.

Photographic film 57 is supplied from a roll 62 and passes through suitable guides 63 to a take-up spool 64. Take-up spool 64 can be electrically driven from the surface of the earth to advance the film after each photograph. The guides 63 for the film are such that they will hold the film in an arcuate position for exposure.

In order to prevent primary radiation from striking the film a vertical shield 65 impenetrable to X-rays, is provided. Shield 65 may be secured to the inner wall of the housing along the line 66.

The various electrically controlled valves, electric motors, X-ray tube, film take-up mechanism, and depth marking device can all be selectively supplied with power from a source located on the earth's surface through the medium of carrier current waves and appropriate filters over a single transmission circuit in the manner taught by the Fearon Patent No. 2,368,532. Since the use of carrier current waves for the transmission of a plurality of signals over a single circuit is well known in the art, it is not believed necessary to make a detailed disclosure of such a system. The power supply and control means are indicated diagrammatically in Figure 1 and the power distribution means are shown diagrammatically at 67 in Figure 1.

In operation the capsule, with window, milling cutters and guides retracted, is lowered in the drill hole to the point from which it is desired to make a log. The cutters and guides are then extended and the process of removing the mud sheath is begun. As the capsule is lowered further with the cutters in operation the squeegees scrape the milled area of the strata clean. After a sufficient area has been cleaned in this manner the window is extended until the mud rings come into contact with the wall. The drilling fluid or mud is then washed from the chamber, formed by the mud rings and the window, by replacing it with fresh water. The recording equipment is then placed into operation and a photograph is made of the X-ray diffraction pattern. The depth mark is then placed on the film and the film is advanced to a position where it is ready for the next exposure.

While the capsule may be held motionless during the exposure which may be of several minutes duration, this is not necessary. Furthermore, use may be made of flash X-ray technique to provide instantaneous exposures.

Without modification the invention described thus far can be used to locate the extremities of casing in a drill hole or cement wherever it protrudes into the hole. This is accomplished by noting the predominance of iron in the diffraction pattern or the substances of which cement is composed.

In Figure 6 there is shown diagrammatically a modified form of the present invention. This embodiment is adapted for use in a drill hole for the purpose of making X-ray diffraction analyses of the drilling fluid or cuttings which have been milled from the wall of the drill hole.

Casing 70 is divided into an upper compartment 71 and a lower compartment 72. Compartment 72 houses a pump 73. Drilling fluid or cuttings are drawn in by the pump 73 through the conduit 74 and discharged into a grinder 75 through a connecting conduit 76. Grinder 75 and pump 73 may be driven through a common shaft by an electric motor 77. The discharge from the grinder 75 is fed into a strainer or filter 78. The strained or filtered sample is forced upwardly through the conduit 79 until it fills the sample tube 80 located in the upper chamber 71 in the path of a pencil-like beam 81 of X-rays which are emitted by the X-ray tube 82. Sample tube 80 may be a thin walled glass or plastic tube. The X-rays in passing through the sample are dispersed into a diffraction pattern. The diffraction pattern is allowed to expose the photographic film 83.

Where fluid samples are handled it is more convenient to coil the film in an arc of perhaps 350° with the sample at the center of the arc. This may be done by using suitable film guides. If the sample is so thick that it will absorb the radiation then the tube 80 may be positioned so that the edge of the sample will be at the center of the film arc. While the sample may be held motionless during the exposure which may be of several minutes duration, this is not necessary. Furthermore, use may be made of flash X-ray technique to provide instantaneous exposures.

After the exposure is made the film is marked by a depth indicator 84, such as that described above, and then the film is moved forward on spools 85 and is ready for the next exposure. The sample is then discharged through conduit 86.

The strainer or filter 78 is provided with means for discharging excess fluid through conduit 87.

All electrical elements are selectively supplied with power from the surface in the manner described above. The power is distributed within the capsule 70 from the power receiver 88 which is connected to the conductors 89.

Where water is leaking into a well, a survey with this apparatus will reveal the nature of the water entering the well; that is, the crystalline salt content and the nature of the crystalline salts present. By showing progressively the change of composition from water to drilling mud, and vice versa, an accurate location of the point of entry of water can be made.

Every crystalline material such as, for example, sodium chloride or potassium carbonate, differs slightly in crystalline structure from every other crystalline material. Thus a diffraction pattern of sodium chloride, see Figure 5, will show certain characteristic lines which can be recognized by anyone skilled in this field of analysis. Accordingly, the pattern found upon the photographic film upon developing may be interpreted as a true analysis of the crystalline material placed in position before the X-ray tube at the time of exposure. If, for example, both potassium carbonate and sodium chloride are present in a physical mixture, both diffraction patterns will appear superimposed on each other on the film and it will be possible to calculate by means of their relative intensities the approximate percentage of each material.

In Figures 7a and 7b there are illustrated X-ray diffraction patterns showing the method of comparing films of two different materials. Figure 7a is an X-ray diffraction pattern of sodium chloride and Figure 7b is a diffraction pattern of a diatomaceous earth.

We claim:

An apparatus for geophysical prospecting comprising in combination an elongated sealed housing adapted to be lowered and raised in a drill hole, means including a cable for lowering and raising said housing in the drill hole, milling cutters carried by said housing for removing the mud sheath from at least a portion of the wall of said drill hole, squeegees also carried by said housing for scraping that portion of the wall from which the mud sheath has been removed, means defining a chamber in said housing, a window in the means defining the chamber adapted to contact the cleaned wall of the drill hole, means including a bellows for extending and retracting said window with respect to the housing, guide means for said housing, pneumatic means for extending said guide means into contact with the wall of the drill hole, separate pneumatic means for operating the milling cutters, the squeegees, the guide extending means, and the means for extending and retracting the window, a multifrequency source of power, electrical means responsive to different frequencies of power for selectively energizing said pneumatic means, an X-ray tube in said chamber for generating X-rays, means for directing the X-rays through said window against the cleaned wall of the drill hole, and a photosensitive element in said chamber for recording the X-rays that have been dispersed by diffraction produced by the crystalline substance or substances in the wall and which have been back-reflected into the chamber.

FRANK P. HOCHGESANG.
CARLETON H. SCHLESMAN.

REFERENCES CITED

The following references are of record in the file of this patent:

UNITED STATES PATENTS

| Number | Name | Date |
|---|---|---|
| 2,025,488 | Yap | Dec. 24, 1935 |
| 2,133,776 | Bender | Oct. 18, 1938 |
| 2,317,329 | McLachlan | Apr. 20, 1943 |
| 2,334,475 | Claudet | Nov. 16, 1943 |
| 2,341,745 | Silverman | Feb. 15, 1944 |
| 2,344,598 | Church | Mar. 21, 1944 |
| 2,400,678 | Archie | May 21, 1946 |